(12) United States Patent  
Parmegiani (10) Patent No.: US 12,508,338 B2
(45) Date of Patent: Dec. 30, 2025

(54) METHOD FOR STERILIZING, CERTIFICATING AND TRACING OF LIQUID NITROGEN

(71) Applicant: NTERILIZER S.R.L., Bologna (IT)

(72) Inventor: Lodovico Parmegiani, Bologna (IT)

(73) Assignee: NTERILIZER S.R.L., Bologna (IT)

( * ) Notice: Subject to any disclaimer, the term of this patent is extended or adjusted under 35 U.S.C. 154(b) by 1007 days.

(21) Appl. No.: 17/640,551

(22) PCT Filed: Jun. 24, 2020

(86) PCT No.: PCT/IB2020/055962
§ 371 (c)(1),
(2) Date: Mar. 4, 2022

(87) PCT Pub. No.: WO2020/261135
PCT Pub. Date: Dec. 30, 2020

(65) Prior Publication Data
US 2022/0395591 A1 Dec. 15, 2022

(30) Foreign Application Priority Data
Jun. 24, 2019 (IT) .......................... 102019000009948

(51) Int. Cl.
*A61L 2/10* (2006.01)
*A61L 2/28* (2006.01)
(Continued)

(52) U.S. Cl.
CPC .................. *A61L 2/28* (2013.01); *A61L 2/10* (2013.01); *G01N 31/226* (2013.01); *G16H 40/20* (2018.01); *A61L 2202/14* (2013.01)

(58) Field of Classification Search
CPC . A61L 2/28; A61L 2/10; A61L 2/0047; A61L 2202/14; G01N 31/226; G16H 40/20; G06Q 10/06395
See application file for complete search history.

(56) References Cited

U.S. PATENT DOCUMENTS 4,620,962 A * 11/1986 Brodbeck ................ F17C 9/02
426/399
2008/0141715 A1 * 6/2008 Chakravarthy ......... A61L 2/022
62/65

FOREIGN PATENT DOCUMENTS

EP 2679248 A1 1/2014
EP 2379119 B1 5/2016
(Continued)

OTHER PUBLICATIONS

International Search Report for PCT/IB2020/055962 dated Dec. 18, 2020 (4 pages).

*Primary Examiner* — Regina M Yoo
(74) *Attorney, Agent, or Firm* — Tutunjian & Bitetto, P.C.

(57) ABSTRACT

A method of sterilisation, certification and traceability of liquid nitrogen, includes the steps of preparing a container, provided with an opening, in use, at the top, and pouring into it a batch of liquid nitrogen to be sterilised; providing an identification element uniquely associable with the batch of liquid nitrogen, said identification element including an indicator of the sterilisation state of the batch contained in said container configured to modify its appearance following exposure to ultraviolet radiation; associating the identification element with the container of the batch of liquid nitrogen to be sterilised, positioning it in a portion of said container, adjacent to said opening; carry out a batch sterilisation treatment through exposure to ultraviolet radiation for a predetermined period of time, to modify at least one characteristic of the indicator to certify the sterilisation of the batch.

16 Claims, 4 Drawing Sheets

(51) Int. Cl.
*G01N 31/22* (2006.01)
*G16H 40/20* (2018.01)

(56) References Cited

FOREIGN PATENT DOCUMENTS

| | | | | |
|---|---|---|---|---|
| JP | 2013531212 A * | 8/2013 | ................ | F25J 1/00 |
| JP | 5675053 B2 | 2/2015 | | |
| WO | 2001010476 A1 | 2/2001 | | |
| WO | WO-2010070432 A1 * | 6/2010 | ............... | A61L 2/10 |
| WO | WO-2011142945 A1 * | 11/2011 | ............. | A61L 2/022 |

\* cited by examiner

METHOD FOR STERILIZING, CERTIFICATING AND TRACING OF LIQUID NITROGEN

TECHNICAL FIELD OF THE INVENTION

The present invention relates to a method of sterilisation, certification and traceability of liquid nitrogen.

More specifically, the present invention relates to a method of sterilisation, certification and traceability of predetermined quantities of liquid nitrogen, used for example in the techniques of cryopreservation of biological material, cryotherapy, or also in the food sector, and the like.

DESCRIPTION OF THE PRIOR ART

As is known, liquid nitrogen is obtained by compression of gaseous nitrogen, which has a very low boiling point (−195.82° C.).

In its practical applications, liquid nitrogen is released by absorbing large quantities of heat during evaporation, and can thus be easily and effectively used as a refrigerant. Although liquid nitrogen has a very low microbial content, since there are few microorganisms in nature that can survive these temperatures, there is however the need to ensure effective nitrogen sterility, given the applications mentioned above, that is, typically those of the medical sector or the food sector.

Companies that supply liquid nitrogen are also usually able to certify the purity and sterility of the nitrogen supplied.

However, it is also known that it is not possible to seal liquid nitrogen containers (also known as cryocontainers) during transport from the manufacturer to the user, which can also involve several intermediaries, precisely because of its particular composition. For this reason, it is not possible to guarantee and certify the sterility of liquid nitrogen before use by the end user.

Nor is it possible to exclude that liquid nitrogen could become contaminated in the same hospital, clinic, medical surgery or laboratory where the cryocontainer is located, for example in the event of incorrect procedures in the handling of potentially infected biological material.

As a consequence of this, the contaminated liquid nitrogen can infect, for example, a biological sample when it comes into direct contact with it, typically in the case of freezing of cells or tissues or in the case of cryopreserved samples in bags, or other devices not accurately sealed or damaged.

Furthermore, contaminated nitrogen can come into direct contact with skin lesions during cryotherapy treatments, and directly infect the patient.

The effectiveness of the use of ultraviolet radiation for the sterilisation of surgical material, surfaces, water and other liquids, including liquid nitrogen, is also known.

To date, there are technical solutions that allow liquid nitrogen to be sterilised immediately before its use, based precisely on the use of ultraviolet radiation.

A specific solution which allows this result to be obtained is described in the document EP2379119B1.

In particular, in this document a solution is described comprising a device provided with a container in which the liquid to be sterilised is placed, and an ultraviolet lamp configured to irradiate the inside of the tank.

The aforesaid container can be made, for example, of stainless steel, and it is inserted, in turn, in a removable way into a thermally insulating support, open at the top.

The liquid, after its sterilisation carried out by ultraviolet radiation, can then possibly be transferred, from said container, to another possible container, suitable for the specific immediate use that must be made of it.

However, this operating mode has some shortcomings and drawbacks.

In particular, it may happen that the user, once a given batch, or quantity, of liquid nitrogen has been sterilised to be used immediately, may lose track of the completed sterilisation process.

In other words—and especially if the user has to work with several batches of liquid nitrogen simultaneously, or in any case within the scope of the same task—the user could, inadvertently and accidentally, confuse batches that are in different conditions, that is, confuse already sterilised batches with others not yet sterilised, with the harmful consequences that can be easily imagined.

It should also be added that—and again within the scope of tasks mainly in the medical sector, which imply the use of a certain amount of batches of liquid nitrogen—the user could, inadvertently and accidentally, confuse batches intended for uses involving given patients.

In fact, typically, batches intended for different patients may have different characteristics, such as the quantity of liquid to be used, the times and methods of sterilisation, the times and methods of use, and others.

The document EP 2 379 119 B1 describes a device and a method for the sterilisation of nitrogen in the liquid phase, by ultraviolet radiation.

The device comprises an ultraviolet irradiating source, consisting of a germicidal lamp, to which a temperature detection sensor (for example a thermocouple) is associated, located in the immediate vicinity of the bulb of the lamp itself.

In the event that the temperature of the bulb of the ultraviolet lamp, measured by the sensor, does not match that of maximum efficiency, an alarm signal is generated which warns the operator that the process is not occurring in the desired way.

However, although the device and method described in this document are able to precisely control the radiation emission mode, they are unable to provide any indication of the actual sterilisation results obtained for the batch, that is to say in other words whether the treatment carried out on the liquid has produced the desired degree of sterilisation, and therefore, whether the radiation has effectively hit the batch properly for the entire treatment time.

SUMMARY OF THE INVENTION

The technical scope of the present invention is to improve the state of the art in the field of liquid nitrogen sterilisation.

Within the scope of this technical task, it is an object of the present invention to develop a method of sterilisation, certification and traceability of liquid nitrogen which allows damages and drawbacks to be prevented that are due to inadvertent and accidental mistakes by the user of batches of liquid nitrogen.

Another object of the present invention is to make available a method of sterilisation, certification and traceability of liquid nitrogen suitable for allowing the user to manage in a simple, reliable and safe way different batches of liquid nitrogen to be used in certain activities.

Another object of the present invention is to devise a method of sterilisation, certification and traceability of liquid nitrogen which can be implemented with low cost and easily available means.

This scope and these objects are all achieved by the sterilisation, certification and traceability of liquid nitrogen method according to the present application.

The method of sterilisation, certification and traceability of liquid nitrogen includes the steps of preparing a container, provided with an opening, in use, at the top, and pouring into it a batch of liquid nitrogen to be sterilised.

It is then required to prepare an identification element that can be uniquely associated with the batch of liquid nitrogen to be sterilised.

The identification element includes an indicator of the sterilisation state of the batch contained in the container, configured to modify its appearance following exposure to ultraviolet radiation.

The method then comprises a step of associating the identification element with the container of the batch of liquid nitrogen to be sterilised, positioning it in a portion of the container adjacent to its opening.

There is also a step of carrying out a batch sterilisation treatment by exposure to ultraviolet radiation for a predetermined period of time, so as to modify at least one characteristic of the indicator, perceivable by the user, so as to certify the sterilisation of the batch itself.

According to an aspect of the invention, the aforementioned identification element comprises at least one adhesive label applicable to the surface of the container.

Furthermore, said indicator of the sterilisation state comprises an adhesive support, applied on said label, in turn having a surface coated with a pigmentation sensitive to ultraviolet radiation.

More particularly, the exposure to ultraviolet radiation is suitable for modifying the colouring of said indicator, or at least a part thereof, switching from a first colouring, which indicates that the sterilisation of the batch of liquid nitrogen has not yet occurred, to a second colouring, which indicates that the sterilisation of the batch of liquid nitrogen has occurred.

Thanks to this result, the user obtains the certification that the sterilisation of that specific batch of liquid nitrogen has actually been carried out as required.

Furthermore, this certification can be processed and traced, in a safe and unambiguous way, within a system for the management of information relating to batches of liquid nitrogen to be used within the scope of a given task.

The present application refers to preferred and advantageous embodiments of the invention.

BRIEF DESCRIPTION OF DRAWINGS

These and additional advantages will be better understood by any technician skilled in the art from the following description and accompanying drawings, provided by way of non-limiting example, in which.

DETAILED DESCRIPTION OF THE INVENTION

Figure 1:
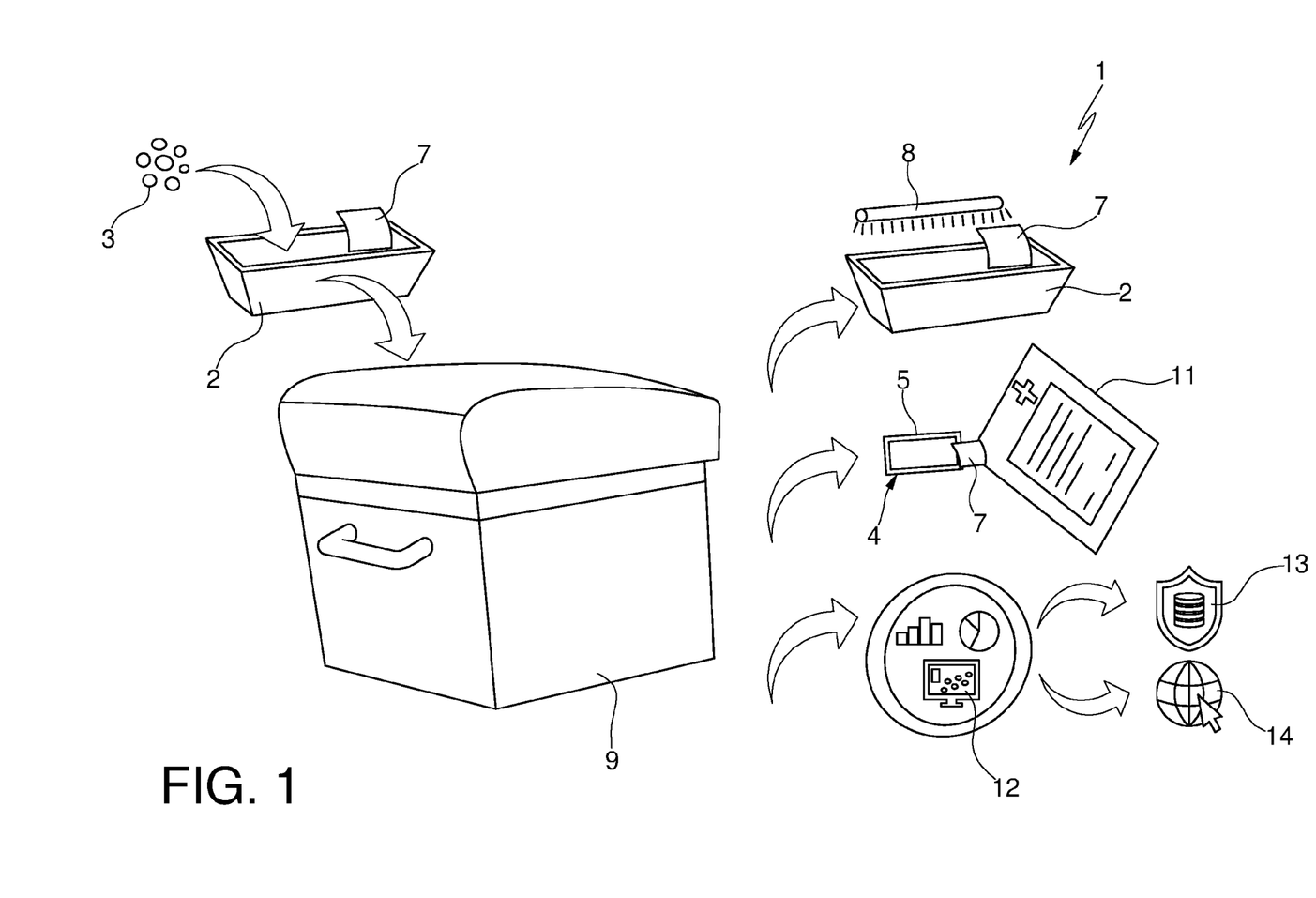
FIG. 1 is a schematic representation of the main operating steps of the method according to the invention.

With particular reference to FIG. 1, the reference number 1 indicates an overall schematic representation of the main operating steps of the liquid nitrogen sterilisation, certification and traceability method according to the present invention.

The method comprises a step of providing a container 2, into which a batch 3 of liquid nitrogen to be sterilised is poured.

The container 2 comprises an opening 2a.

The opening 2a, in the configuration of use, faces upwards.

Through the opening 2a, the batch 3 of liquid nitrogen to be sterilised is introduced into the container 2.

Batch 3 includes a given quantity of liquid nitrogen, necessary to carry out a given task, for example in the field of cryopreservation techniques of biological material, cryotherapy, or also in the food sector, and the like, without particular limitations for the purposes of the present invention.

The method further comprises a step of preparing an identification element 4 of a given batch 3 of liquid nitrogen.

The identification element 4 can be associated, or is configured to be uniquely associated, with a given batch 3 of liquid nitrogen.

The method comprises a step of associating the aforementioned identification element 4 with the container 2 of the batch 3 of liquid nitrogen to be sterilised.

According to an aspect of the invention, the identification element 4 is positioned in a portion of the container 2 adjacent to its opening 2a.

In more detail, the identification element 4 can comprise a label 5, for example an adhesive label 5, or the like, applicable to the surface of the container 2.

The label 5 may contain certain information relating to the batch 3 of liquid nitrogen with which it is associated, and/or one or more bar codes 6 identifying batch 3, and/or other information necessary for the management and use of the aforementioned batch 3, without particular limitations.

The identification element 4 also comprises, in turn, an indicator 7 of the sterilisation state of batch 3 contained in container 2.

The indicator 7 is configured so as to modify its appearance, perceivable by the user, following exposure to ultraviolet radiation.

In other words, the indicator 7 is sensitive to exposure to ultraviolet radiation.

This means that exposure to ultraviolet radiation modifies at least one characteristic of the indicator 7, perceivable by the user.

For example, exposure to ultraviolet radiation changes the pigmentation, or colouring, of the indicator 7, or at least of a part thereof.

Consequently, in practical use, the indicator 7 which has not yet been exposed to ultraviolet radiation has a first colouring.

The same indicator 7, following exposure to ultraviolet radiation, takes on instead a second colouring, different from the first colouring.

Such second colouring, perceivable by the user, therefore certifies, clearly and unequivocally, that the batch 3 with which the indicator 7 is associated has been exposed to ultraviolet radiation.

In more detail, such second colouring certifies that the batch 3, with which the indicator 7 is associated, has been subjected to ultraviolet radiation characterised by certain characteristics which are those suitable for obtaining the desired sterilisation effect.

The indicator 7 can comprise, for example, an adhesive support (for example a paper support), applied on the label 5, which in turn is provided with a surface covered with a pigmentation sensitive to ultraviolet radiation.

The method then comprises a step of carrying out a sterilisation treatment of the aforementioned batch 3 of liquid nitrogen, together with the respective identification element 4.

The sterilisation step is carried out by exposing the batch 3 of liquid nitrogen, inside its container 2, to a device 8 that emits ultraviolet radiation having certain characteristics, i.e. for example a given intensity, a given exposure time to radiation, and others.

Such sterilisation step comprises an introduction phase of the container 2 into an apparatus 9 suitable for ensuring the exposure to ultraviolet radiation of the aforementioned batch 3 of liquid nitrogen.

The apparatus 9 can be, for example, of the type described in the document EP 2 379 119 B1, or other apparatus suitable for carrying out the same treatment.

The operating parameters of the sterilisation step can also be set according to the provisions of the aforementioned document EP 2 379 119 B1, without however this constituting a limitation.

In detail, the sterilisation step of the batch 3 of liquid nitrogen can comprise a step of introducing the container 2 into a special thermally insulating support 10, open at the top.

The support 10 can be made, for example, of a polymeric material with suitable properties, for example polystyrene, foam polystyrene, or other similar materials.

Upon completion of the sterilisation step (and therefore upon completion of treatment, carried out according to given parameters and for a predetermined period of time), the indicator 7 (which initially had, as mentioned, the first colouring) takes on the second colouring, which therefore informs the user, in an immediate, safe and intuitive way, that the batch 3 of liquid nitrogen contained in the container 2 has been effectively, and completely, sterilised in the desired way.

In an embodiment of the invention, the first colouring can be for example the colour red or yellow, or another colour conventionally chosen.

Furthermore, the second colouring can be for example the colour green, or another colour conventionally chosen so as to be immediately recognisable.

In the case of insufficient exposure (and therefore of not complete sterilisation of batch 3), the indicator 7 could take on an intermediate colouring between the two aforementioned colours, thus alerting the operator that the treatment was not completed correctly.

A step is then provided to remove the container 2 from the apparatus 9 (and therefore also from the thermally insulating support 10).

The user can then move on to the specific use for which that specific batch 3 of liquid nitrogen, now sterilised, is intended.

In a step of the method according to the invention, the identification element 4 of the container 2 can be removed from the container 2 itself and associated, for example, with a medical record 11, or with another document containing information relating to a specific patient, or to a specific activity to be carried out with batch 3 of liquid nitrogen already sterilised, so as to allow traceability of this batch 3 of liquid nitrogen. The indicator 7, possibly separated from label 5, can also be associated with the same medical record 11, to certify that the sterilisation treatment of that specific batch 3 has taken place.

As an alternative to the application of the indicator 7 on the medical record 11, the operator can write, or somehow indicate, on the same medical record 11, that the sterilisation treatment has been carried out completely and correctly.

In another step of the method according to the invention, the information relating to batch 3 of sterilised liquid nitrogen, univocally traceable through the aforementioned identification element 4, can also be processed and organised via a computer 12, a tablet, a smartphone, or another device suitable for data processing.

Furthermore, this information can be saved in a specially developed database 13.

The database 13 can also be associated with a specific information processing and management software.

Database 13 allows for keeping track of all batches 3 of liquid nitrogen previously sterilised and/or previously used.

Access to database 13, and any associated management software, is allowed only through user authentication, and can be protected by modern IT security systems, for example through Blockchain® technology.

More specifically, in another step of the method according to the invention, access to the aforementioned database 13 can take place through one (or more) web page 14, which can comprise a menu provided with different options for displaying and processing the information contained in the database 13.

Figure 4:
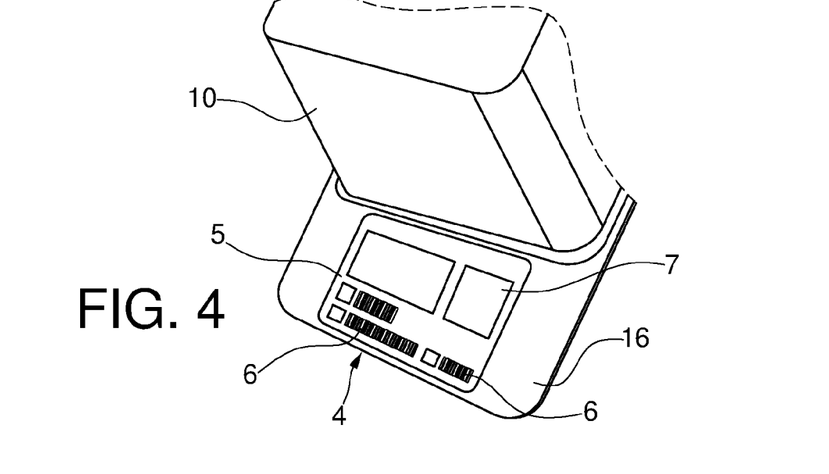
FIG. 4 is a detailed perspective view of the identification element of the container of the batch of liquid nitrogen to be sterilised.

As shown in FIG. 4, and according to another aspect of the invention, the container 2 comprises an edge 15; this edge 15 surrounds the opening 2a (in other words, it is around the perimeter).

The edge 15 comprises, in turn, a portion 16, adjacent to the opening 2a of the container, intended for the application of the identification element 4 (in particular, of the label 5).

The portion 16 constitutes a sort of lateral extension of the edge 15, i.e. it extends from one of the sides of the aforementioned edge 15.

In use, the portion 16 lies, essentially, on the same plane on which the free surface of the batch 3 of liquid nitrogen lies; or, it lies on a plane parallel, or substantially parallel, to that on which the aforementioned free surface of batch 3 lies.

Furthermore, the ultraviolet radiation that hits the container 2, during the sterilisation treatment, is perpendicular, or substantially perpendicular, to the indicator 7, and to the free surface of the batch 3 of liquid nitrogen, so as to obtain a maximum efficiency operating configuration.

This constitutes a guarantee that the ultraviolet radiation, emitted by the device 8, hits, in substantially the same way and with the same characteristics, the free surface of batch 3—and therefore the liquid nitrogen—and the identification element 4. In other words, in this way the risks that the indicator 7 of the container 2 is hit by radiation with different characteristics (for example with different intensity) from that which actually hits the free surface of the batch 3 are eliminated, or considerably limited, thus providing incorrect information on the sterilisation performed, also in consideration of the fact that the appearance (colour) of the indicator 7 changes after being exposed to radiation for at least a predetermined period of time and with a predetermined intensity.

At the same time, this measure also allows energy savings to be achieved, by preventing a batch 3 from being exposed to ultraviolet radiation for a longer period of time than is actually necessary.

According to another aspect of the invention, the container 2 for a respective batch 3 of liquid nitrogen is configured to be of the disposable type.

In more detail, the container 2 is configured in such a way that it can be produced in a simple and inexpensive way, suitable for preserving sterility, and also so that it can be easily disposed of after its use.

Figure 2:
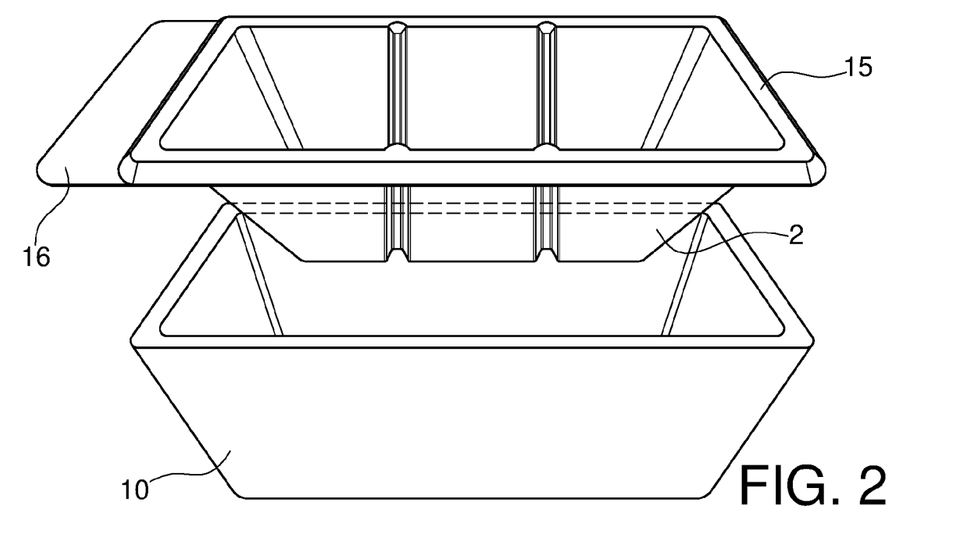
FIG. 2 is a perspective view of the container of the liquid nitrogen batch to be sterilised, during the step of insertion in the insulating support of the sterilisation apparatus.
Figure 3:
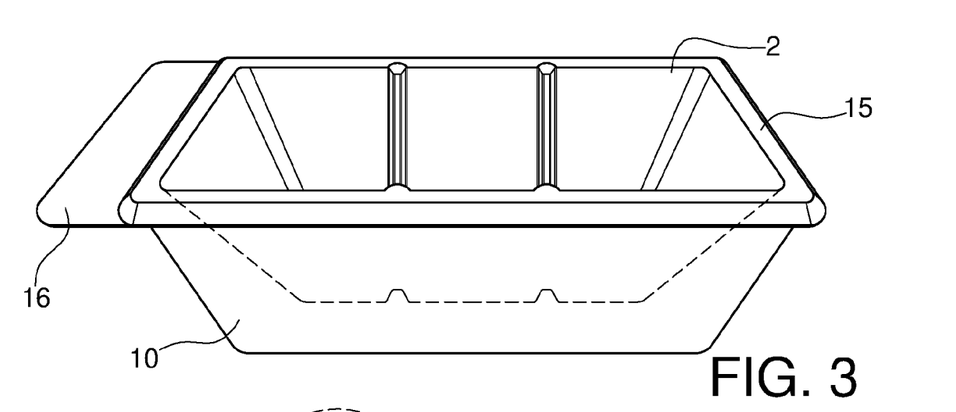
FIG. 3 is a perspective view of the container of the liquid nitrogen batch to be sterilised, inserted in the insulating support of the sterilisation apparatus.

As shown in FIGS. 2, 3, the container 2 can be made of polymeric material, for example one or more materials chosen from: EVA (ethylene vinyl acetate), PVC (polyvinyl chloride), PET (polyethylene terephthalate), or other materials suitable for preserving sterility, by moulding or another suitable technology.

The container 2 can be moulded to a thin thickness, thus obtaining a light and handy solution.

The shaping of the container 2 also allows for easy stacking, so as to minimise the space required for storage.

Figure 5:
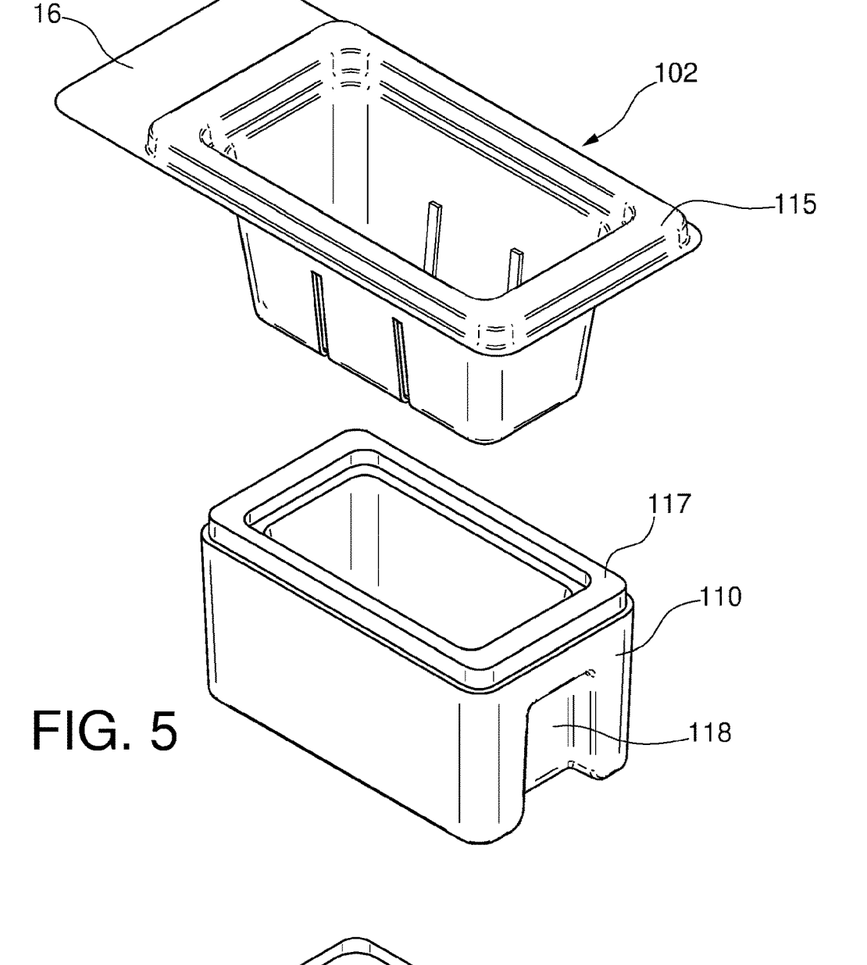
FIG. 5 is an exploded view of another version of the container of the liquid nitrogen batch to be sterilised, during insertion into the insulating support of the sterilisation apparatus.
Figure 6:
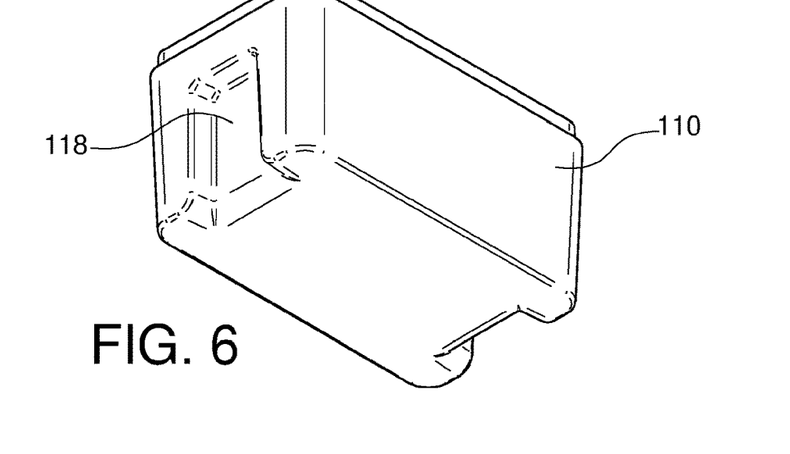
FIG. 6 is a perspective view from the bottom of the container of the batch of liquid nitrogen to be sterilised according to the previous figure.
Figure 7:
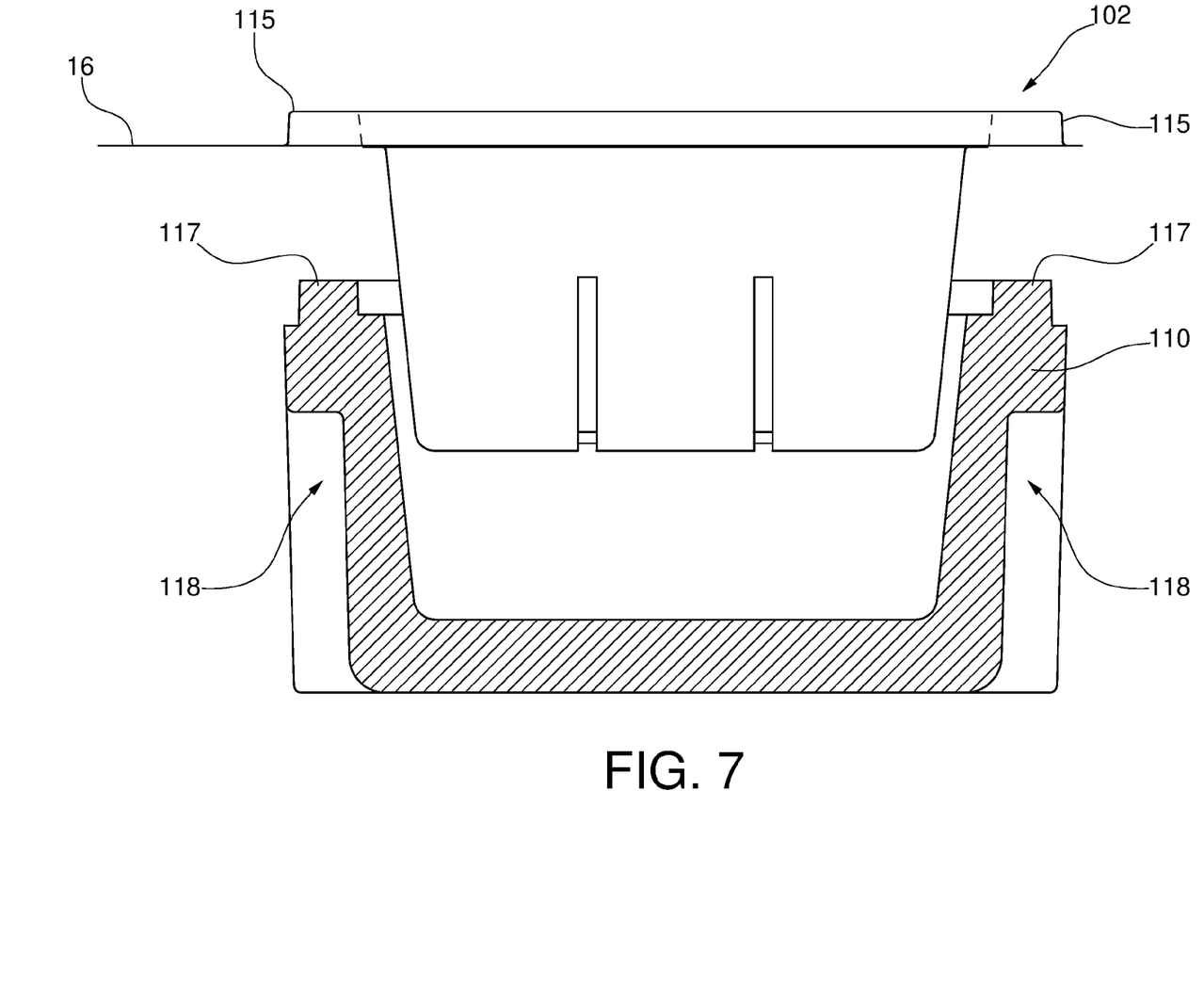
FIG. 7 is a cross-section view of the container of the batch of liquid nitrogen to be sterilised according to FIGS. 5 and 6.

According to the present invention, in FIGS. 5 and 6 another version of the container and its thermally insulating support is illustrated; in the description that follows elements equal to the previous version will have equal numbering, while similar but different elements will have a numbering increased by 100.

FIGS. 5 and 6 show a container 102 which has a shaping similar to that of the container 2 of the previous version, and is made with the same materials and with the same methods, this container 102 being intended for insertion in a thermally insulating support 110; as for the container 2 of the previous version, the container 102 has a shaping which also allows its easy stacking.

The container 102 comprises a folded edge 115 with a portion 16 of this edge 115 intended, as in the previous version, for the application of the identification element 4, in particular, of the label 5.

The thermally insulating support 110 comprises a shaped edge 117 intended to be associated with the edge 115 of the container 102, in particular the profile of the shaped edge 117 is complementary to the profile of the folded edge 115.

The support 110 also comprises two recesses 118 to facilitate the gripping and transport of the support 110 itself with the container 102.

An object of the present invention is also a container 2, 102 for liquid nitrogen having the characteristics described above.

This invention design enables to obtain important technical advantages.

As highlighted, first of all, the user can obtain the safe and reliable certification that a specific batch 3 of liquid nitrogen has actually been sterilised as required.

This eliminates the risks of possible errors or mistaking of potentially infected or contaminated batches.

In addition, the information relating to the certification performed can be easily traced in all subsequent use steps, both by using the identification element 4 (which can be applied, for example, to a medical record 11 or another type of document), and using the information associated with this identification element 4 (which can be acquired for example by reading a bar code) in management systems comprising a database 13, specific processing software, or other.

The proposed solution is also of simple and cost efficient implementation, also thanks to the fact that specially developed disposable containers 2 are used.

Furthermore, the proposed solution is particularly effective as regards the aspect of ensuring the actual sterilisation of liquid nitrogen according to the desired characteristics and parameters.

It has thus been seen how the invention achieves the intended purposes.

The present invention has been described according to preferred embodiments, but equivalent variants can still be conceived without departing from the scope of the appended claims.

The invention claimed is:

1. A method for sterilisation, certification and traceability of liquid nitrogen, comprising the steps of
preparing a container, provided with an opening and a surface, in use, and pouring a batch of liquid nitrogen to be sterilised into it;
preparing an identification element uniquely associable to said batch of liquid nitrogen, said identification element comprising an indicator of the state of sterilisation of the batch of liquid nitrogen contained in said container configured so as to modify its appearance following exposure to ultraviolet radiation;
associating said identification element with said container of the batch of liquid nitrogen to be sterilised, positioning it on a portion of said container, adjacent to said opening; and
performing a sterilisation treatment of said batch of liquid nitrogen by means of exposure to ultraviolet radiation for a predetermined period of time, so as to modify at least one characteristic of said indicator, perceivable by a user, so as to certify a successful sterilisation of said batch of liquid nitrogen.

2. The method according to claim 1, wherein said identification element comprises at least one adhesive label to be applied to the surface of said container.

3. The method according to claim 2, wherein said indicator comprises an adhesive support, applied on said at least one adhesive label, in turn having a surface coated with a pigmentation sensitive to ultraviolet radiation.

4. The method according to claim 3, wherein the exposure to ultraviolet radiation is adapted to modify the colouring of said indicator, or at least a part of said indicator, switching from a first colouring, which indicates that the sterilisation of said batch of liquid nitrogen has not yet occurred, to a second colouring, which indicates that the sterilisation of said batch of liquid nitrogen has occurred.

5. The method according to claim 2, wherein said container is configured to be disposable.

6. The method according to claim 5, wherein said container is made of polymeric material, by means of moulding.

7. The method according to claim 5, wherein said container is made of one or more materials selected from EVA, or PVC, or PET.

8. The method according to claim 1, wherein said container comprises an edge, provided with sides, which surrounds the opening, said edge comprising said portion on which said identification element is applied.

9. The method according to claim 8, wherein said portion extends from one of the sides of said edge, and in use lies substantially on the same plane on which the free surface of the batch of liquid nitrogen lies, or on a plane parallel to, or substantially parallel to, the one on which the free surface of the batch of liquid nitrogen lies.

10. The method according to claim 1, wherein the ultraviolet radiation which hits said container during said treatment is perpendicular, or substantially perpendicular, to said indicator and to the free surface of the batch.

11. The method according to claim 1, wherein said step of performing a sterilisation treatment of said batch of liquid nitrogen, comprises a step of introducing said container into an apparatus comprising a device for emitting ultraviolet radiation.

12. The method according to claim 11, wherein said step of performing a sterilisation treatment of said batch comprises a step of introducing said container into a thermally insulating support, open at the top, made of polymer material.

13. The method according to claim 1, comprising a step of removing said identification element from said container and applying said identification element, or said indicator, to a medical record, or to another document containing information relating to a specific task to be carried out with the sterilised batch of liquid nitrogen.

14. The method according to claim 1, further comprising a step of processing information, that the sterilisation treatment has been carried out completely and correctly, related to said sterilised batch of liquid nitrogen, uniquely traceable through said identification element, by means of a data processing device comprised of a computer or a tablet or a smartphone, and a step of saving said information in a database.

15. The method according to claim 14, comprising a step of accessing said database through at least one web page comprising a menu with various options for displaying and processing the information contained in said database.

16. The method according to claim 14, wherein said database is protected by IT security systems.

* * * * *